United States Patent [19]
Kobayashi

[11] Patent Number: 5,568,647
[45] Date of Patent: Oct. 22, 1996

[54] SERIAL CONTROL APPARATUS WITH A SINGLE CHIP SELECT SIGNAL

[75] Inventor: Yuji Kobayashi, Kanagawa, Japan

[73] Assignee: Sony Corporation, Tokyo, Japan

[21] Appl. No.: 21,676

[22] Filed: Feb. 24, 1993

[30] Foreign Application Priority Data

Feb. 28, 1992 [JP] Japan ................................ 4-043649

[51] Int. Cl.⁶ ........................... G06F 13/00; G06F 13/20
[52] U.S. Cl. ................. 395/823; 395/200.16; 395/824; 395/828; 395/829; 364/238.3; 364/247.2; 364/926.93
[58] Field of Search ............................ 395/275, 725, 395/828, 829, 823, 824, 200.16

[56] References Cited

U.S. PATENT DOCUMENTS

| | | | |
|---|---|---|---|
| 3,715,725 | 2/1973 | Kievit et al. | 340/147 |
| 4,268,904 | 5/1981 | Suzuki et al. | 364/200 |
| 4,628,478 | 12/1986 | Henderson, Jr. | 364/900 |
| 4,769,768 | 9/1988 | Bomba et al. | 364/200 |
| 4,809,229 | 2/1989 | Nukiyama | 365/189 |
| 4,912,309 | 3/1990 | Danielson et al. | 235/380 |
| 4,930,070 | 5/1990 | Yonekura et al. | 364/200 |

Primary Examiner—Thomas C. Lee
Assistant Examiner—Rehana Perveen Krick
Attorney, Agent, or Firm—Jay H. Maioli

[57] ABSTRACT

A serial control apparatus is arranged so that an increased number of ICs mounted on a printed circuit card does not increase the number of signal lines for selecting the ICs. The serial control apparatus has a plurality of printed circuit cards each carrying a plurality of ICs and a CPU for controlling the plurality of ICs. Each card has a card match detecting means for identifying the card itself and generating a chip select signal to be sent commonly to all ICs on that card. Each of the ICs contains IC a match detector means for identifying the IC itself. The CPU generates serial identification signals including a card specification signal and an IC specification signal. Based on these signals and each of the match detectors, a particular IC on a particular card is selected.

21 Claims, 5 Drawing Sheets

FIG. 5A
CLOCK

FIG. 5B
ADDRESS DATA

FIG. 5C
DATA WRITTEN TO REGISTER

5,568,647

SERIAL CONTROL APPARATUS WITH A SINGLE CHIP SELECT SIGNAL

BACKGROUND OF THE INVENTION

1. Field of the Invention

The present invention relates to a serial control apparatus and, more particularly, to a serial control apparatus for use in a video editing apparatus, VTR, video camera or the like.

2. Description of the Prior Art

Conventional video editing apparatus use a mother printed-circuit board on which a plurality of printed-circuit cards including a reference signal generator card, a mixer card, and an input circuit card are mounted, thus enhancing card mounting efficiency as a whole.

Figure 3:
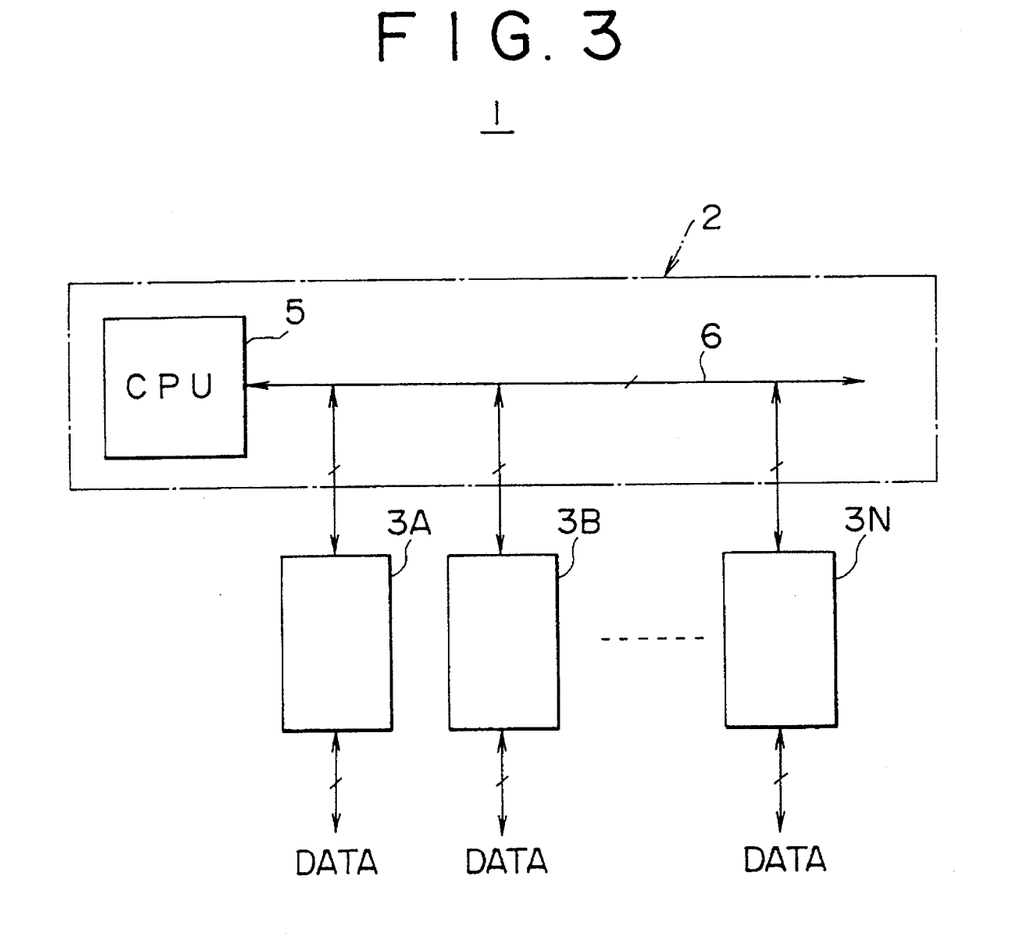
FIG. 3 is a schematic diagram of an editing unit.

The cards mounted on the mother board are managed and controlled overall by a control central processing unit (hereinafter referred to as a CPU) mounted on the mother board and uses serial control signals. For instance, as shown in FIG. 3 of the accompanying drawings, the apparatus comprises a CPU 5 and a plurality of cards 3 (3A, 3B, ..., 3N) interconnected with each other on a mother board 2 by a common bus 6 with the CPU 5 controlling the cards 3A, 3B, ... 3N by its serial control signal.

Each of the cards 3A, 3B, ... 3N may carry a single integrated circuit (hereinafter referred to as an IC); frequently, however, each card carries a plurality of ICs which provide either the same or different functions. Thus in the serial control, not only is a particular card controlled by a serial control signal but also each IC on the card is controlled by the same serial control signal. Consequently, such cards are often constituted as shown in FIG. 4 of the accompanying drawings.

The cards 3A, 3B, ... 3N have the same basic constitution and differ only in the type or functionality of the ICs mounted on them. Therefore, the following description will be of only the card 3A as shown in FIG. 4 by way of example.

Figure 4:
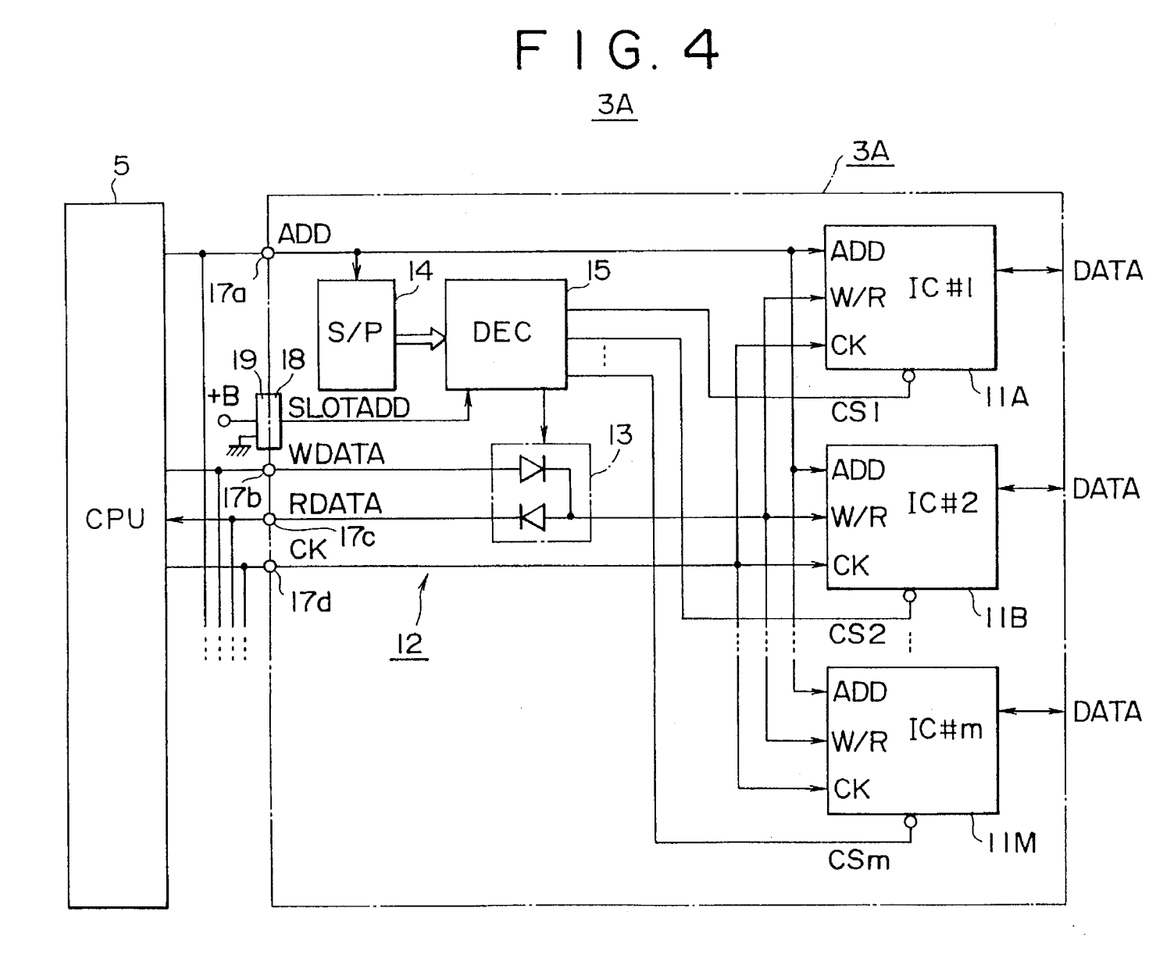
FIG. 4 is a connection diagram of a conventional printed-circuit card.

In an example shown in FIG. 4, a number "M" of ICs, IC11A through 11M are mounted on the card 3A. A serial interface 12 is attached to the card 3A to control these ICs. The serial interface 12 comprises a serial-parallel converter 14 for converting an address data ADD and its address decoder 15. The address decoder 15 generates chip select signals CS1, CS2, ... CSm corresponding to IC11A, 11B, ... 11M for selecting particular ICs.

The address decoder 15 also controls supply of data WDATA to be written to a single or plurality of registers, not shown, installed on the IC11A, 11B, ... 11M and write and read control signals to a data controller 13 for controlling a data RDATA read from the registers.

When the card 3A is mounted on the mother board 2, a connector 18 of the card is coupled with a connector 19 of the mother board. The connector 19 has a connection pattern unique to that card. In this example, five connector pins are connected to a power or ground line according to the connection pattern. When the connectors are mated, an identification code (slot address) SLOTADD corresponding to each card number (slot number) is generated. The slot address SLOTADD is fed to the address decoder 15.

The mother board 2 and the card 3A are connected through the common bus 6 FIG. 3. Reference numerals 17a through 17d in the accompanying drawings indicate input pins on the card 3A. When an address data ADD synchronized with a clock signal CK (shown in FIG. 5 as B and A respectively) comes from the mother board 2 to the card 3A, this serial address data is converted by the serial-parallel converter 14 to an equivalent parallel data to be fed to the address decoder 15.

At the address decoder 15, slot address ADS consisting of first 5 bits of the address data ADD is compared with the slot address SLOTADD on the card 3A. If they are found matching, it is determined that the card 3A has been selected and the address data ADD that follows the slot address ADS is interpreted.

In interpreting the input address data ADD, error detection is performed on the address data ADD based on parity sign P attached to an end thereof. If no error has been detected or when error correction has been completed, an IC specified by an IC address data ICAD is accessed. Access to the IC is made by a chip select signal CSi (i=1 to m). Because the chip select signal or signals CSi are all generated by the address decoder 15, m chip select signal lines are provided, m corresponding to the number of ICs mounted on the card.

When the IC has been selected, data is written to a single or a plurality of registers, not shown, provided on the IC. The data is written to an area specified by a register address REGAD. During data read, a register or an IC is specified and contents of the specified register or IC are read out.

When the card is composed as shown in FIG. 4, the number of chip select signal lines from the address decoder 15 increases in proportion to the number of ICs mounted on the card because the ICs are selectively specified by the address decoder 15. As a result, when the number of mounted ICs increases, the scale of the card carrying the ICs will increase accordingly.

OBJECTS AND SUMMARY OF THE INVENTION

The present invention is intended to provide an improved serial control apparatus so constituted that the scale of cards will not increase even if the number of ICs mounted on them increases.

According to the present invention there is provided a serial control apparatus comprising:

a plurality of printed circuit boards, at least one of which carries a plurality of integrated circuits, a central processing unit for controlling the plurality of said integrated circuits;

printed-circuit board identifying means mounted on each of said printed-circuit boards for identifying the respective printed circuit boards; and integrated circuit identifying means in each of said integrated circuits for identifying the respective integrated circuits;

wherein said central processing unit is connected to send serial identification signals for specifying a particular printed-circuit board and particular integrated circuit to said printed-circuit board identifying means and said integrated circuit identifying means for the purpose of selecting a particular integrated circuit on a particular printed-circuit board according to the serial identification signals.

Thus in operation of a particular embodiment, when a match is found between a slot address ADS and a slot address SLOTADD, an address decoder sends a chip select signal CS to each of the integrated circuits (ICs). An IC address ICAD that follows the slot address ADS is fed to each of the integrated circuits to detect an IC address match or mismatch in each IC.

Each of the integrated circuits is assigned with a unique address ICADDi (i=1 to m). The entered IC address ICAD is matched against this unique address in each IC. Only the IC on which a match has been found is enabled for further processing. Because IC address matching is thus performed against the unique IC address ICADD set at each IC, only one line for the chip select signal CS fed from the address decoder is required. Consequently, an increased number of ICs mounted on each of printed circuit boards does not increase the number of chip select lines.

BRIEF DESCRIPTION OF THE DRAWINGS

In the figures, like reference characters designate like or corresponding parts throughout.

DESCRIPTION OF THE PREFERRED EMBODIMENT

A preferred embodiment of the present invention will be described in detail, referring to the accompanying drawings, by using an example where a serial control apparatus concerning the present invention is applied to an electronic apparatus such as an electronic editing unit using many printed-circuit cards 3A through 3N detachably mounted on a mother board 2 having a CPU 5 as shown in FIG. 3, each card carrying a plurality of IC'S. As before, the serially transmitted address data ADD selectively in order a card, an IC on the card, and a register on the IC.

Figure 1:
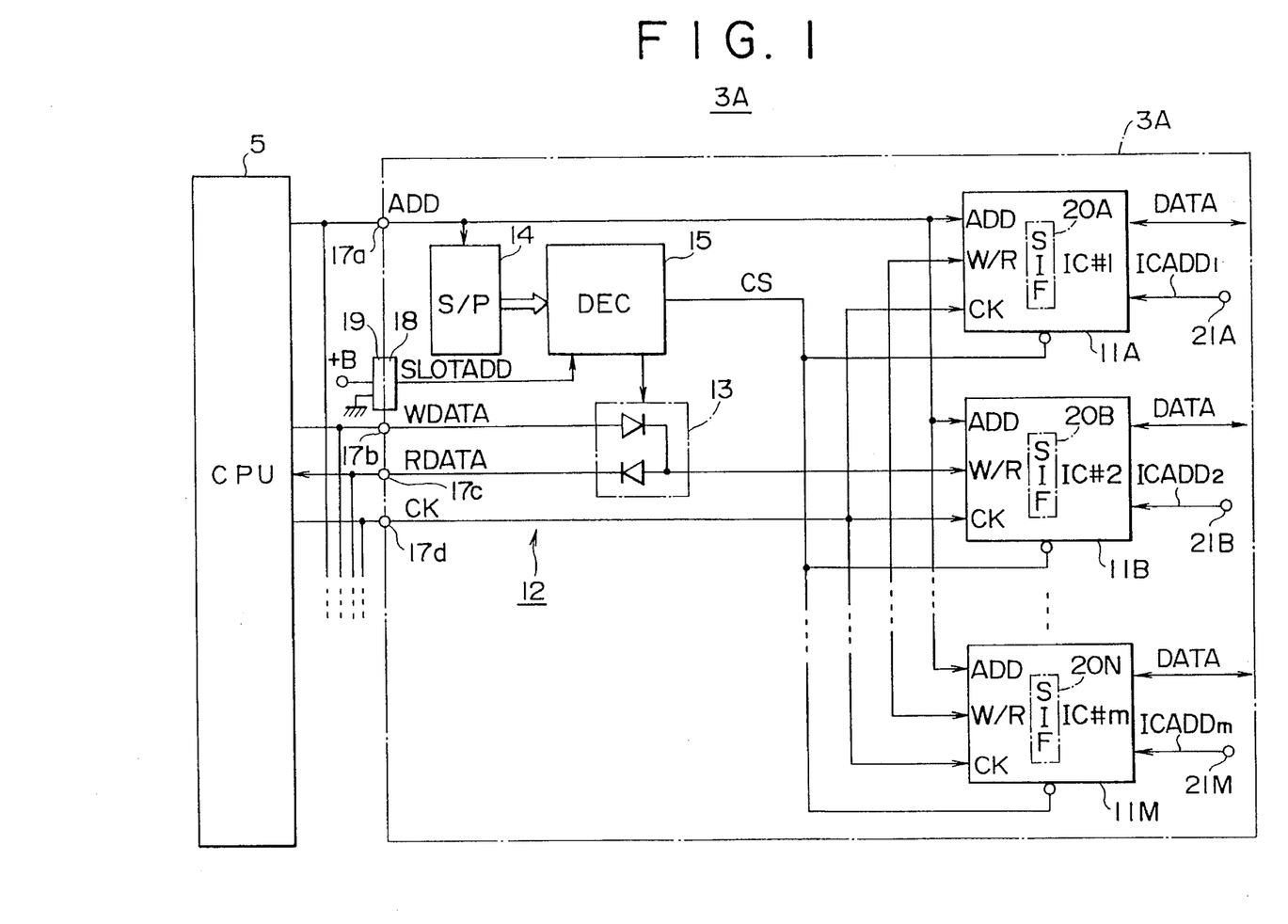
FIG. 1 is a connection diagram of a printed-circuit card providing a serial control circuit according to a preferred embodiment of the present invention.

Since the cards 3A through 3N have the same basic constitution, the following description will be made using the card 3A by way of example. FIG. 1 shows a practical constitution of the card 3A according to a preferred embodiment of the present invention. This constitution is basically the same as a conventional one shown in FIG. 4; the difference lies in that the address decoder 15 in the present invention sends a single chip select signal CS commonly to all of the ICs IC11A through IC11M on the card 3A when that card has been selected.

To allow selection of the IC on the card, each of IC11A through IC11M is assigned a unique address ICADDi (i=1 to m) which is specified by entering information having a particular address specification pattern through a dedicated pin 21A.

Each of IC11A through IC11M is also provided with a serial interface (SIF) 20A receiving the signal ADD from pin 17a for determining whether that IC has been selected or not. The serial interface 20A is constituted in a similar way to the serial interface 12 for the card 3A and will be described in detail by referring to FIG. 2.

Figure 2:
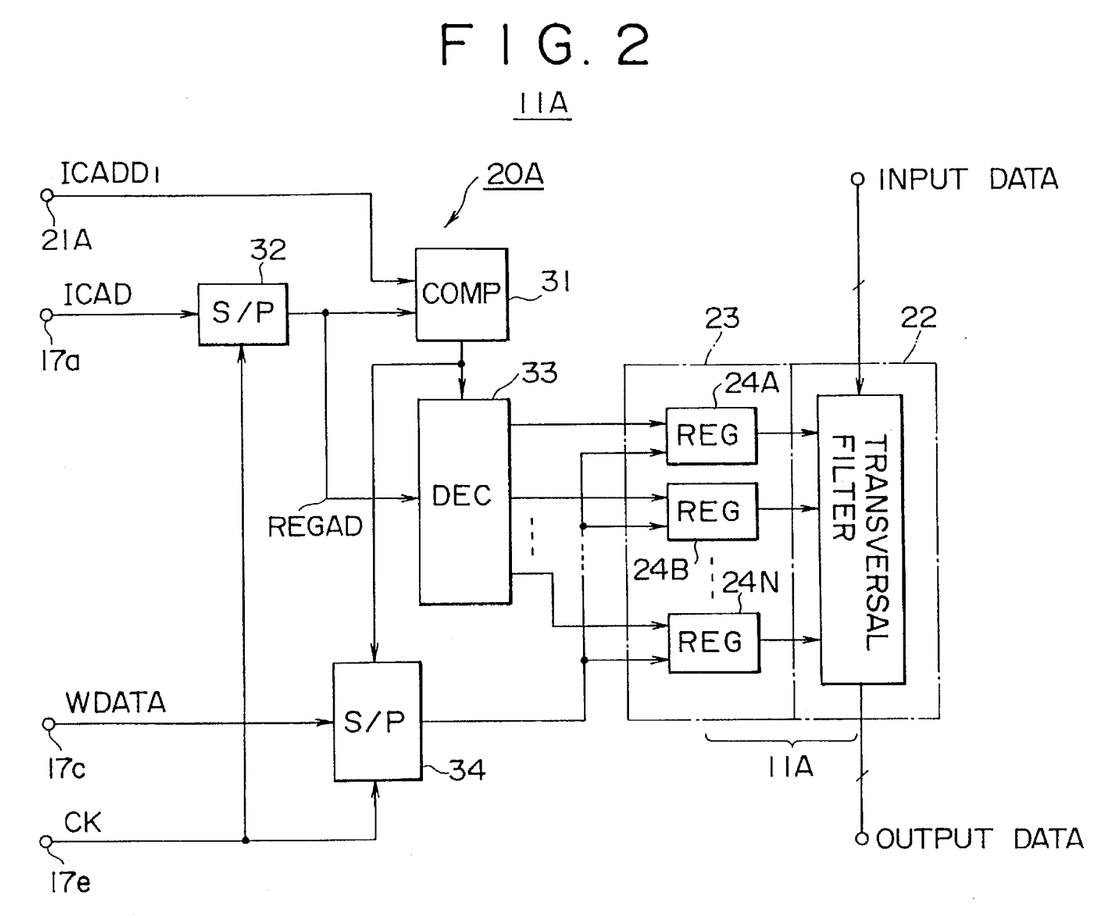
FIG. 2 is a connection diagram of an IC embodying the present invention.

FIG. 2 shows an example in which the IC11A is constituted as a transversal filter on the card 3A. These are used in video special effects apparatus, etc. The transversal filter comprises a main body 22 and a coefficient setting circuit 23.

As generally known, the filter main body 22 comprises a plurality of unit delay elements, a plurality of multipliers for multiplying each delay output by coefficient k, and an adder for adding multiplication results. None of the unit delay elements, multipliers, and adder are shown in the figure.

The coefficient setting circuit 23 has registers 24A through 24N (N is an integer) for coefficient setting of corresponding to the number of multipliers constituting the filter main body 22. Coefficient k which is preset to each of registers 24A through 24N is fed to each multiplier. The characteristic of the transversal filter can be freely set by varying the number of unit delay elements or values of multiplication coefficient k. Preset values for registers 24A through 24N are set according to the application of the filter. The preset values are set via the serial interface 20A.

The serial interface 20A has an address comparator 31 to which an ICADD1 unique to that IC is applied through the pin 21A. An IC specification address (IC address) ICAD entered via the pin 17a is converted by a serial-parallel converter 32 to an equivalent parallel data to be fed to the address comparator 31 where it is compared with the address ICADD1.

If a match is found between the preset IC address ICADD1 and the input address ICAD, it is determined that the IC11A has been selected, which enables a register address decoder 33. When the decoder is enabled, a register address REGAD following the IC address ICAD is converted to an equivalent parallel data to be entered in the register address decoder 33. If a match is not found, the register address decoder 33 is not enabled and therefore no decode processing follows. This process occurs in each IC on the card.

The register address decoded by the register address decoder 33 specifies one of the coefficient setting registers 24A through 24N on the coefficient setting circuit 23, and thereby enables the specified register.

At the same time, the output of the address comparator 31 enables a serial-parallel converter 34 to convert a write data WDATA coming from a pin 17c to an equivalent parallel data to be fed commonly to the registers 24A through 24N.

Figure 5A:
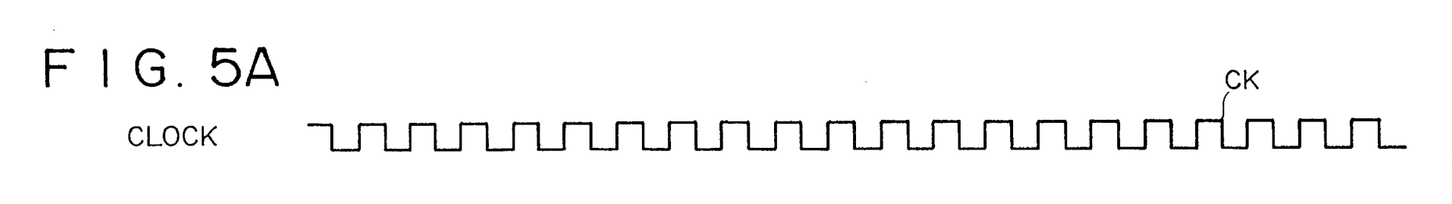
FIG. 5 is a diagram depicting the signals used in the apparatus.
Figures 5B, 5C:
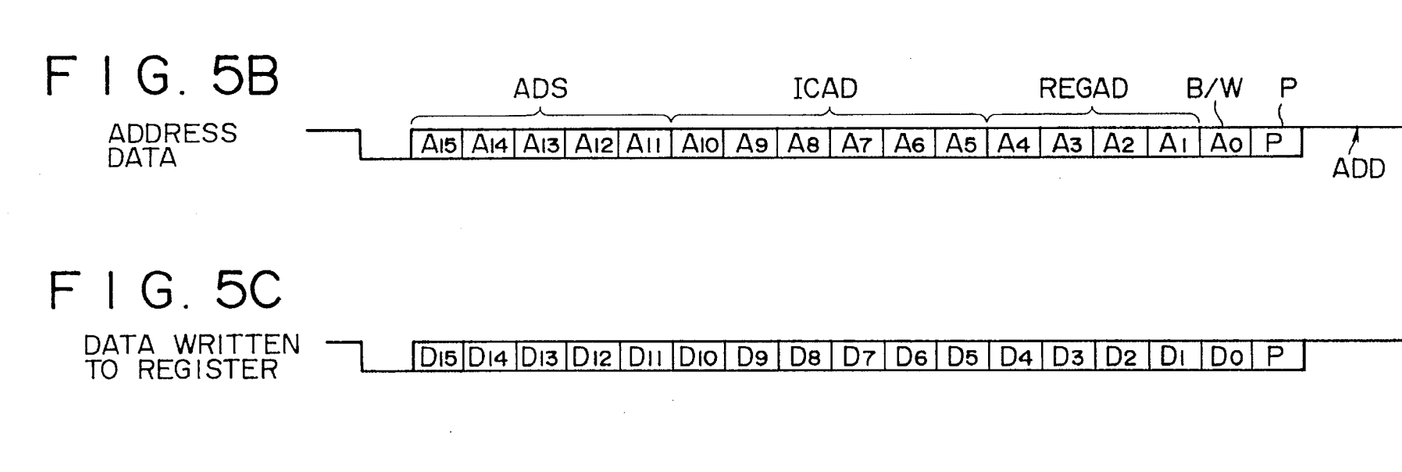

In the example shown in FIG. 5, only one register can be specified. Therefore, one particular register is specified by the decoder 33 from among a plurality of registers 24A through 24N. The data in the specified register is rewritten by the write data WDATA output of the serial-parallel converter 34 in synchronization with a clock signal CK. When updating data on a plurality of registers, this operation shown in FIG. 5 is repeated the required number of times.

If a variable delay element, for example, is used for the IC, a variable delay is set by the registers. In this case, the transversal filter main body 22 provides the variable delay element main body and the coefficient setting circuit 23 is composed of a single register (a variable delay setting register).

Thus with the invention each of the cards 3A through 3M is selected by matching its card address by a serial interface 12 mounted thereon. A particular IC on the selected card is selected by matching the IC address from the address data ADD to a specific IC address entered in that particular IC via pins 21A . . . 21M.

Consequently, the serial interface 12 functions as card match detecting means for identifying particular cards and the serial interface 20A functions as IC match detecting means for identifying particular IC's.

Thus as described and according to the invention, there is provided a serial control circuit comprising printed-circuit card match detecting means for identifying a card carrying such means and IC match detecting means for identifying an IC containing such means, wherein a particular IC on a particular card is selected based on a serial identification signal coming from the CPU and each of the match detecting means. Because a particular IC is selected by matches the unique IC address assigned to that IC, the number of lines for conveying chip select signals from the address decoder on each card is reduced to one and the number of chip select signal lines does not depend on the number of IC's mounted on each card, thereby reducing the circuit scale on each card.

What is claimed is:

1. A serial control apparatus comprising:

a plurality of printed circuit boards, each printed circuit board having a plurality of integrated circuits, each printed circuit board having a corresponding board identifier, and each integrated circuit having a corresponding IC identifier;

printed circuit board identifying means mounted on each of said plurality of respective printed circuit boards for setting the board identifier of the printed circuit board;

integrated circuit identifying means for identifying each of said plurality of respective integrated circuits, said integrated circuit identifying means including respective IC identifier setting means for adjustably setting the respective IC identifier of said plurality of respective integrated circuits;

PC board IC selecting means mounted on each of said plurality of respective printed circuit boards for comparing a board identification to the board identifier of the corresponding one of said plurality of printed circuit boards, and sending a single chip select signal to all of said plurality of integrated circuits to enable transfer Of data to and from the respective integrated circuits on the printed circuit board if the board identification matches the board identifier of the corresponding one of said plurality of printed circuit boards; and a central processing unit for controlling said plurality of printed circuit boards and said plurality of integrated circuits, said central processing unit being connected to send serial identification signals for specifying a particular printed circuit board and a particular integrated circuit to be selected to said PC board IC selecting means and said integrated circuit identifying means, and thereby selecting a particular one of said plurality of integrated circuits on a particular one of said plurality of printed circuit boards for communication directly with said central processing unit.

2. A serial control apparatus according to claim 1 wherein said PC board IC selecting means decodes the serial identification signal from said central processing unit, and thereby determines the board identification identifying the particular one of said plurality of printed circuit boards.

3. A serial control apparatus according to claim 1 wherein said PC board IC selecting means and said integrated circuit identifying means are respectively connected to receive directly the serial identification signals from said central processing unit.

4. A serial control apparatus according to claim 1 wherein said PC board IC selecting means of the particular one of said plurality of printed circuit boards is operative in response to the serial identification signal received from said central processing unit identifying the particular one of said plurality of printed circuit boards for enabling transfer of further data between said central processing unit and the particular one of said plurality of printed circuit boards, and otherwise not enabling the transfer of data.

5. A serial control apparatus according to claim 2 wherein said integrated circuit identifying means of the particular one of said plurality of integrated circuits is operative in response to serial identification data received from said central processing unit identifying the particular one of said plurality of integrated circuits for enabling decoding of further data from said central processing unit and otherwise not enabling the decoding.

6. Serial control apparatus according to claim 1 wherein said PC board IC selecting means of the particular one of said plurality of printed circuit boards comprises a serial-to-parallel converter for converting the serial identification signals received from said central processing unit into parallel identification signals, and a comparator for comparing the parallel identification signals with the board identifier unique to the particular one of said plurality of printed circuit boards.

7. Serial control apparatus according to claim 6 wherein the the board identifier is set by said printed circuit board identifying means according to a connection pattern of a connector to the particular one of said plurality of printed circuit boards.

8. Serial control apparatus according to claim 1 wherein said IC identifier setting means of each of said integrated circuit identifying means includes a serial interface connected to receive integrated circuit identifier data specific to the corresponding integrated circuit through a dedicated terminal thereof.

9. Serial control apparatus according to claim 8 wherein said serial interface includes:

a serial-to-parallel converter for converting serial integrated circuit identification signals received from said central processing unit into parallel integrated circuit identification signals; and a comparator for comparing said parallel integrated circuit identification signals to the integrated circuit identifier.

10. Serial control apparatus according to claim 1 wherein at least one of said plurality of integrated circuits includes:

a plurality of registers; and a decoder for decoding data from said central processing unit to select one of said plurality of registers and enable transfer of data with respect to said central processing unit.

11. Serial control apparatus according to claim 10 wherein at least one of said plurality of integrated circuits is a transversal filter.

12. A serial control method for controlling from a central processing unit a plurality of printed circuit boards at least one of which carries a plurality of integrated circuits each having integrated circuit identifying means, and each printed circuit board having a board identifier, the method comprising the steps of:

sending integrated circuit identifier data through respective dedicated terminal pins of said plurality of respective integrated circuits to said respective integrated circuit identifying means, each integrated circuit identifier data being unique to the integrated circuit to which the integrated circuit identifier data is sent;

sending serial identification signals for specifying a particular printed circuit board and particular integrated circuit thereon from said central processing unit to each of said plurality of printed circuit boards and said integrated circuit identifying means, respectively;

comparing at each printed circuit board the serial identification signals received from said central processing unit to the board identifier of the printed circuit board;

sending a single chip select signal commonly to each integrated circuit only on the identified printed circuit board to enable transfer of data between the integrated circuits on the identified printed circuit board and said central processing unit; and comparing at said integrated circuit identifying means of an integrated circuit receiving the chip select signal the received serial identification signals with the integrated circuit identifier identifying the integrated circuit, the identified integrated circuit thereby being selected for communication directly with said central processing unit.

13. A serial control method according to claim 12 including the steps of:

decoding at each printed circuit board a board identification from the serial identification signals received from said central processing unit; and comparing the board identification to the board identifier of the printed circuit board.

14. A serial control method according to claim 12 including the step of sending the serial identification signals identifying both the particular printed circuit board and the particular integrated circuit directly to all of said plurality of printed circuit boards and all of said integrated circuit identifying means.

15. A serial control method according to claim 13 including the further step of enabling transfer of data between the identified printed circuit board and the central processing unit.

16. A serial control method according to claim 13 further including the of enabling decoding of further data from said central processing unit only at the identified integrated circuit.

17. A method according to claim 12 including the steps at each printed circuit board of:

converting the serial identification signals into parallel identification signals; and comparing said parallel identification signals with preset slot address data constituting the board identifier of the printed circuit board.

18. A method according to claim 17 including the step of reading the preset slot address data from the connection pattern of connectors at each printed circuit board.

19. A method according to claim 12 including the step of setting the local integrated circuit identifiers of said plurality of respective integrated circuits according to the respective integrated circuit identifier data supplied through the respective dedicated terminal pins of said plurality of respective integrated circuits.

20. A method according to claim 19 including the steps at each integrated circuit identifying means of:

converting the serial identification signals received from said central processing unit into parallel identification signals; and comparing the parallel-converted identification signals to the local integrated circuit identifier.

21. A method according to claim 12 wherein one of said plurality of integrated circuits comprises a plurality of registers and is the identified integrated circuit, and further including the steps of:

decoding the serial identification signals from said central processing unit to select one of said plurality of registers at the one of said plurality of integrated; circuits and enabling transfer of data between the selected register and said central processing unit.

* * * * *

UNITED STATES PATENT AND TRADEMARK OFFICE
CERTIFICATE OF CORRECTION

PATENT NO. : 5,568,647
DATED : October 22, 1996
INVENTOR(S) : Yuji Kobayashi

It is certified that error appears in the above-identified patent and that said Letters Patent is hereby corrected as shown below:

Title page, item [57],
In the Abstract, line 7, change "detecting means" to --detector--
                line 8, change "that" to --the--
                line 9, delete "means"
Col.1, line 63, change "Fig.3" to --, as shown in Fig.3--
Col.3, line 40, after "selectively" insert --specifies--
Col.4, line 7, delete "of"
Col.5, line 6, change "matches" to --matching--

Col.5, line 34, change "Of" to --of--

Signed and Sealed this

Thirtieth Day of June, 1998

*Attest:*

BRUCE LEHMAN

*Attesting Officer*        *Commissioner of Patents and Trademarks*